(12) United States Patent
Shitrit

(10) Patent No.: US 11,059,109 B2
(45) Date of Patent: Jul. 13, 2021

(54) CUTTING HEAD HAVING TORQUE TRANSMISSION SURFACES ON A MOUNTING PROTUBERANCE AND ROTARY CUTTING TOOL HAVING SUCH CUTTING HEAD

(71) Applicant: Iscar, Ltd., Tefen (IL)

(72) Inventor: Shim'on Shitrit, Kibbutz Metsuba (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 16/236,918

(22) Filed: Dec. 31, 2018

(65) Prior Publication Data

US 2020/0206826 A1 Jul. 2, 2020

(51) Int. Cl.
*B23B 51/02* (2006.01)
*B23B 27/16* (2006.01)

(52) U.S. Cl.
CPC .............. *B23B 51/02* (2013.01); *B23B 27/16* (2013.01); *B23B 2251/02* (2013.01); *B23B 2251/50* (2013.01)

(58) Field of Classification Search
CPC ..... B23B 27/16; B23B 51/02; B23B 2251/02; B23B 2251/50; B23B 2240/04; B23B 31/113
See application file for complete search history.

(56) References Cited

U.S. PATENT DOCUMENTS

| | | | |
|---|---|---|---|
| 6,109,841 A | 8/2000 | Johne | |
| 6,276,879 B1 | 8/2001 | Hecht | |
| 6,582,164 B1 | 6/2003 | McCormick | |
| 7,309,196 B2 | 12/2007 | Ruy Frota De Souza | |
| 7,360,974 B2 | 4/2008 | Borschert et al. | |
| 7,377,730 B2 | 5/2008 | Hecht et al. | |
| 7,467,915 B2 | 12/2008 | De Souza | |
| 7,972,094 B2 | 7/2011 | Men et al. | |
| 8,021,088 B2 | 9/2011 | Hecht | |

(Continued)

OTHER PUBLICATIONS

International Search Report dated Feb. 13, 2020, issued in PCT counterpart application (No. PCT/IL2019/051323).

(Continued)

*Primary Examiner* — Eric A. Gates
*Assistant Examiner* — Paul M Janeski
(74) *Attorney, Agent, or Firm* — Womble Bond Dickinson (US) LLP

(57) ABSTRACT

A cutting head rotatable about a head axis, has a cap portion and a mounting protuberance joined thereto and extending axially rearwardly therefrom. The mounting protuberance has a plurality of circumferentially spaced apart torque portions axially offset from a plurality of circumferentially spaced apart clamping portions. The clamping portions have clamping surfaces circumscribed by an imaginary clamping circle with a clamping diameter. The torque portions have torque protrusions and torque cut-outs, each torque protrusion having a torque transmission surface at least partially located outside an imaginary clamping cylinder defined by the imaginary clamping circle, and each torque cut-out having a recessed surface located inside the imaginary clamping cylinder. The cutting head is releasably secured to a head receiving pocket of a tool shank, with each clamping surface contacting a corresponding abutment surface of the pocket, and each torque transmission surface contacting a corresponding drive surface of the pocket.

25 Claims, 7 Drawing Sheets

(56) References Cited

U.S. PATENT DOCUMENTS

| | | |
|---|---|---|
| 8,534,966 B2 | 9/2013 | Hecht |
| 8,556,552 B2 | 10/2013 | Hecht |
| 8,992,141 B2 | 3/2015 | Hecht et al. |
| 8,992,142 B2 | 3/2015 | Hecht |
| 9,028,180 B2 | 5/2015 | Hecht |
| 10,071,430 B2 | 9/2018 | Frota De Souza Filho et al. |
| 2012/0315101 A1 | 12/2012 | Osawa et al. |
| 2015/0266107 A1 | 9/2015 | Gonen et al. |
| 2017/0100784 A1 | 4/2017 | Frota De Souza Filho et al. |

OTHER PUBLICATIONS

Written Opinion dated Feb. 13, 2020, issued in PCT counterpart application (No. PCT/IL2019/051323).

CUTTING HEAD HAVING TORQUE TRANSMISSION SURFACES ON A MOUNTING PROTUBERANCE AND ROTARY CUTTING TOOL HAVING SUCH CUTTING HEAD

FIELD OF THE INVENTION

The present invention relates to a cutting head having torque transmission surfaces on a mounting protuberance and a rotary cutting tool having such cutting head, for use in metal cutting processes in general, and for drilling operations in particular.

BACKGROUND OF THE INVENTION

Within the field of cutting tools used in drilling operations, there are some examples of rotary cutting tools with cutting heads having torque transmission surfaces on a mounting protuberance.

U.S. Pat. No. 6,582,164 discloses a removable tip having a front end and a rear end. The front end has two cutting portions circumferentially alternating with a two chip flutes, and the rear end is defined by a shaft, adapted to be inserted in the connection bore of a drill body, and having diametrically opposed external threads extending therefrom. Each external thread has a diminishing radius defining a drive face which cooperates with the drive face of a corresponding internal thread of the drill body, for transmitting rotational forces between the drill body and the removable tip.

U.S. Pat. No. 10,071,430 discloses a cutting head formed for insertion into a support in a modular rotary tool. The cutting head has a coupling pin having torque surfaces and clamping surfaces on its outer periphery. The coupling pin is divided into a front pin part and a rear pin part. The front pin part is defined by a circumferential groove. Stop surfaces for an axial pullout safety are formed in the transition area between the two the front pin part and the rear pin part. The torque surfaces and the clamping surfaces are arranged in different pin parts. The clamping surfaces are preferably formed on the front pin part and the torque surfaces are preferably formed in the rear pin part.

It is an object of the present invention to provide an improved cutting head having torque transmission surfaces on a mounting protuberance.

It is also an object of the present invention to allow the cutting head's cutting portions to be arranged in an optimized manner.

It is a further object of the present invention to enable efficient and stable torque transmission between a tool shank and the cutting head.

SUMMARY OF THE INVENTION

In accordance with the present invention, there is provided a cutting head having a head axis establishing an axial forward direction and an axial rearward direction, the cutting head rotatable about the head axis in a direction of rotation, and comprising:
a cap portion having a plurality of N cutting portions circumferentially alternating with a plurality of N head flutes, and a cap base surface facing in the axial rearward direction; and
a mounting protuberance joined to the cap portion, extending axially rearwardly from the cap base surface, and comprising:
an end surface distal from the cap portion and facing in the axial rearward direction, and
a plurality of N circumferentially spaced apart torque portions axially offset from a plurality of N circumferentially spaced apart clamping portions,
each clamping portion having a radially outward facing clamping surface, and
each torque portion having a radially outward extending torque protrusion and a circumferentially adjacent and rotationally trailing torque cut-out, each torque protrusion having a torque transmission surface facing opposite the direction of rotation,
wherein in a first cross-section taken in a first head plane perpendicular to the head axis and intersecting the plurality of clamping portions:
an imaginary clamping circle having a clamping diameter circumscribes the plurality of clamping surfaces,
and wherein in a second cross-section taken in a second head plane parallel to the first head plane and intersecting the plurality of torque portions:
each torque transmission surface is at least partially located outside an imaginary clamping cylinder defined by the imaginary clamping circle, and
each torque cut-out has a recessed surface located inside the imaginary clamping cylinder.

Also, in accordance with the present invention, there is provided a rotary cutting tool comprising a tool shank extending along a shank axis, and a cutting head of the sort described above releasably secured to a head receiving pocket of the tool shank at forward end thereof.

In the cutting tool, the shank's forward end has a shank support surface transverse to the shank axis and the head receiving pocket is formed in the shank support surface,
wherein in an assembled position:
the cap base surface faces the shank support surface;
the head axis is coincident with the shank axis;
each clamping surface is in contact with a corresponding radially inward facing abutment surface of the head receiving pocket; and
each torque transmission surface is in contact with a corresponding drive surface of the head receiving pocket, which faces in the direction of rotation.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
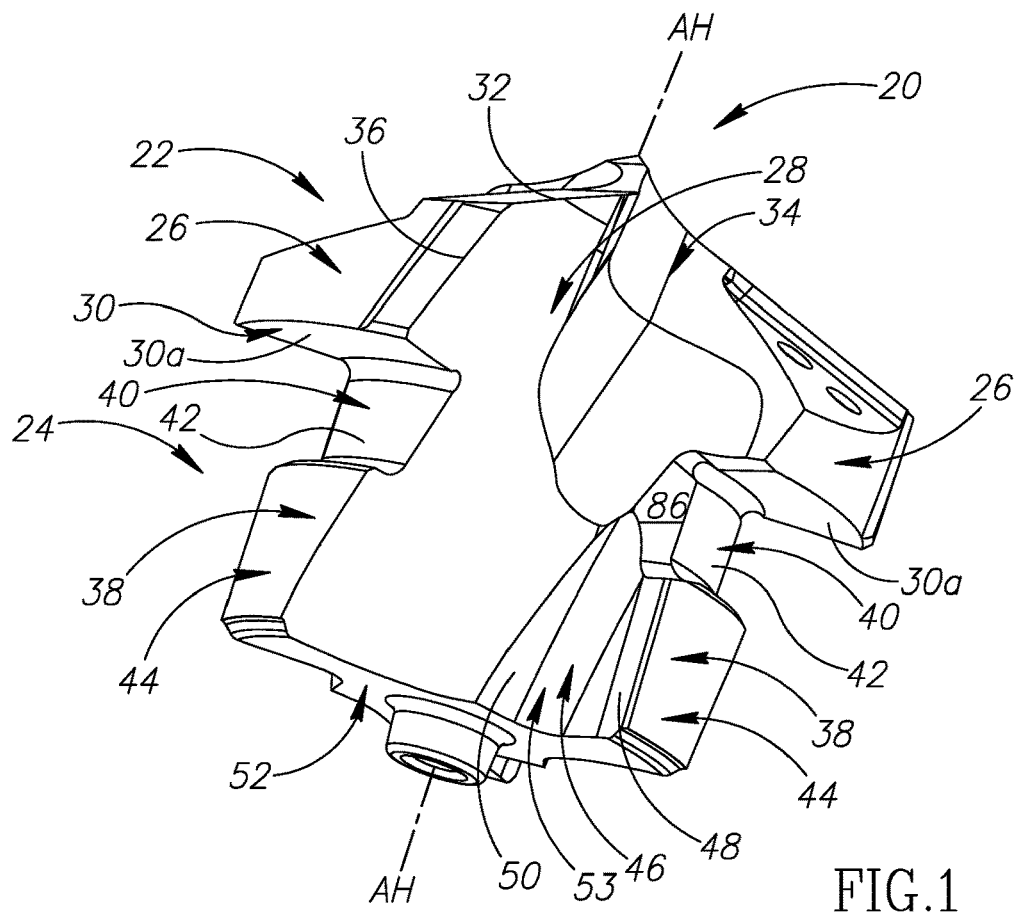
FIG. 1 is a first perspective view of a cutting head in accordance with some embodiments of the present invention.

A first aspect of the present invention relates to a cutting head 20 rotatable about a head axis AH in a direction of rotation R1. The head axis AH establishes an axial forward direction DF and an axial rearward direction DR of the cutting head 20.

In some embodiments of the present invention, the cutting head 20 may preferably be manufactured by form pressing and sintering a cemented carbide, such as tungsten carbide, and may be coated or uncoated.

As shown in FIGS. 1 to 5, the cutting head 20 comprises a cap portion 22 and a mounting protuberance 24 joined to the cap portion 22.

The cap portion 22 has a plurality of N cutting portions 26 circumferentially alternating with a plurality of N head flutes 28, and a cap base surface 30 facing in an axial rearward direction DR.

In some embodiments of the present invention, each cutting portion 26 may have a radially extending cutting edge 32, and each head flute 28 may have a web thinning region 34 adjacent to a portion of its associated cutting edge 32.

Also, in some embodiments of the present invention, each cutting portion 26 may have an axially extending leading edge 36, and the cap portion 22 may have a cutting diameter DCU defined by the plurality of leading edges 36.

Further, in some embodiments of the present invention, the cap base surface 30 may be perpendicular to the head axis AH.

Yet further, in some embodiments of the present invention, the cap base surface 30 may have N circumferentially spaced apart cap base sub-surfaces 30a.

Figure 3:
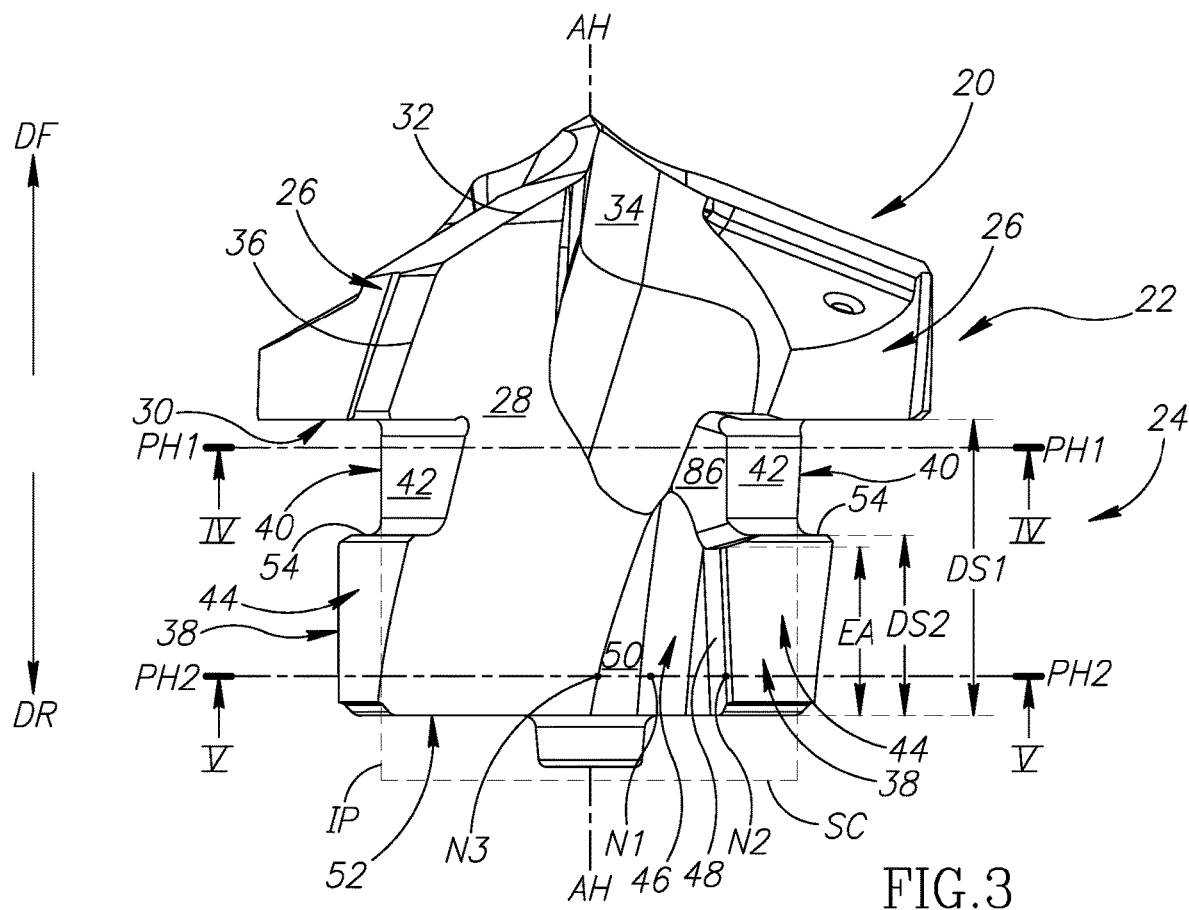
FIG. 3 is a side view of the cutting head shown in FIGS. 1 and 2.

As shown in FIGS. 1 and 3, the mounting protuberance 24 extends axially rearwardly from the cap base surface 30 and has a plurality of N circumferentially spaced apart torque portions 38 axially offset from a plurality of N circumferentially spaced apart clamping portions 40.

In some embodiments of the present invention, the plurality of torque portions 38 may be located axially rearward of the plurality of clamping portions 40.

Also, in some embodiments of the present invention, the mounting protuberance 24 may exhibit N-fold rotational symmetry about the head axis AH.

Further, in some embodiments of the present invention, that N is a whole number equal to three, i.e. N=3.

Figure 4:
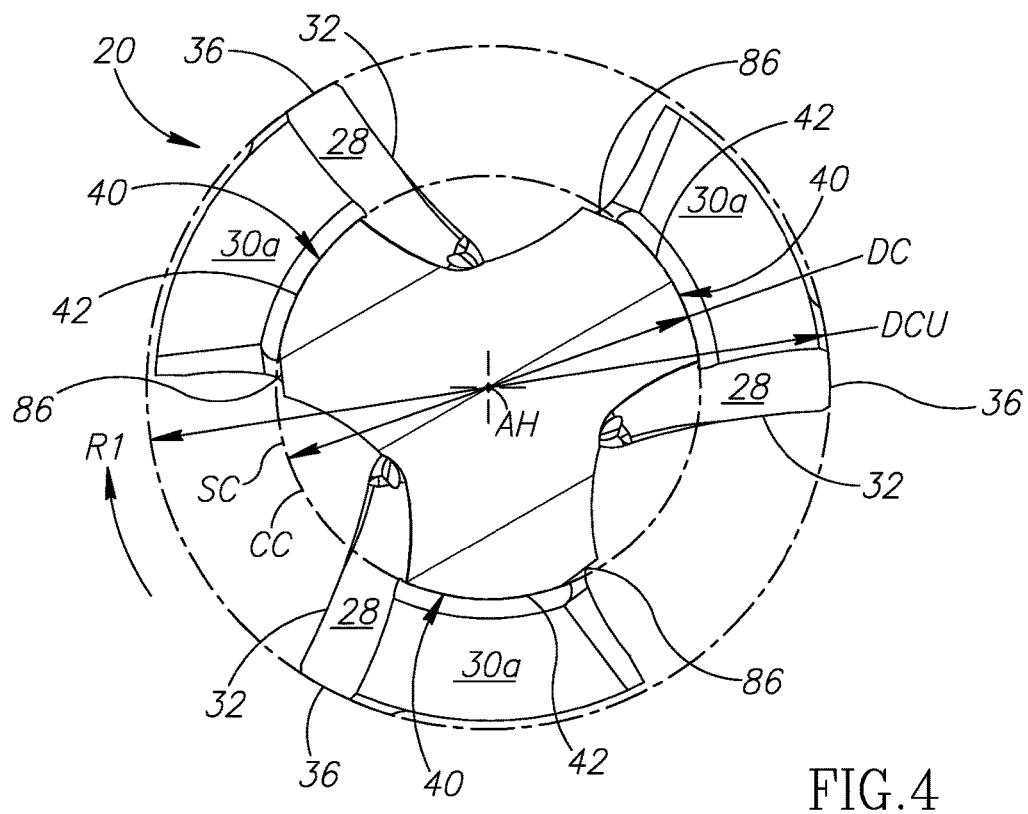
FIG. 4 is a cross-sectional view of the cutting head shown in FIG. 3, taken along the line IV-IV.

As shown in FIGS. 3 and 4, each clamping portion 40 has a radially outward facing clamping surface 42.

In some embodiments of the present invention, each clamping surface 42 may be convex.

As shown in FIG. 4, in a first cross-section taken in a first head plane PH1 perpendicular to the head axis AH and intersecting the plurality of clamping portions 40, an imaginary clamping circle CC having a clamping diameter DC circumscribes the plurality of clamping surfaces 42.

Also, as shown in FIG. 4, in the first cross-section taken in the first head plane PH1, each clamping surface 42 may be coincident with the imaginary clamping circle CC.

It should be appreciated that in the first cross-section taken in the first head plane PH1, none of the plurality of clamping portions 40 may extend outside of the imaginary clamping circle CC.

In some embodiments of the present invention, the plurality of clamping portions 40 may be circumferentially spaced apart by the plurality head flutes 28.

Also, in some embodiments of the present invention, each clamping surface 42 may intersect a circumferentially adjacent and rotationally leading head flute 28.

Figure 5:
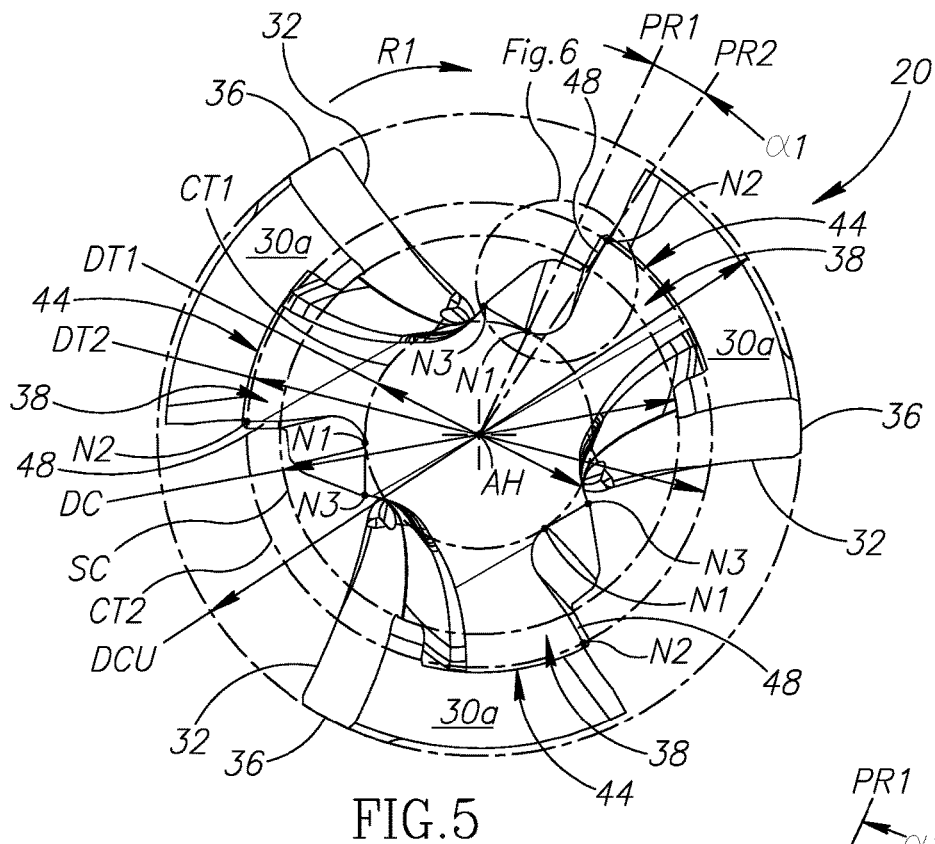
FIG. 5 is a cross-sectional view of the cutting head shown in FIG. 3, taken along the line V-V.

As shown in FIGS. 3 and 5, each torque portion 38 has a radially outward extending torque protrusion 44 and a circumferentially adjacent and rotationally trailing torque cut-out 46.

In some embodiments of the present invention, the plurality of torque portions 38 may be circumferentially spaced apart by the plurality head flutes 28.

Figure 2:
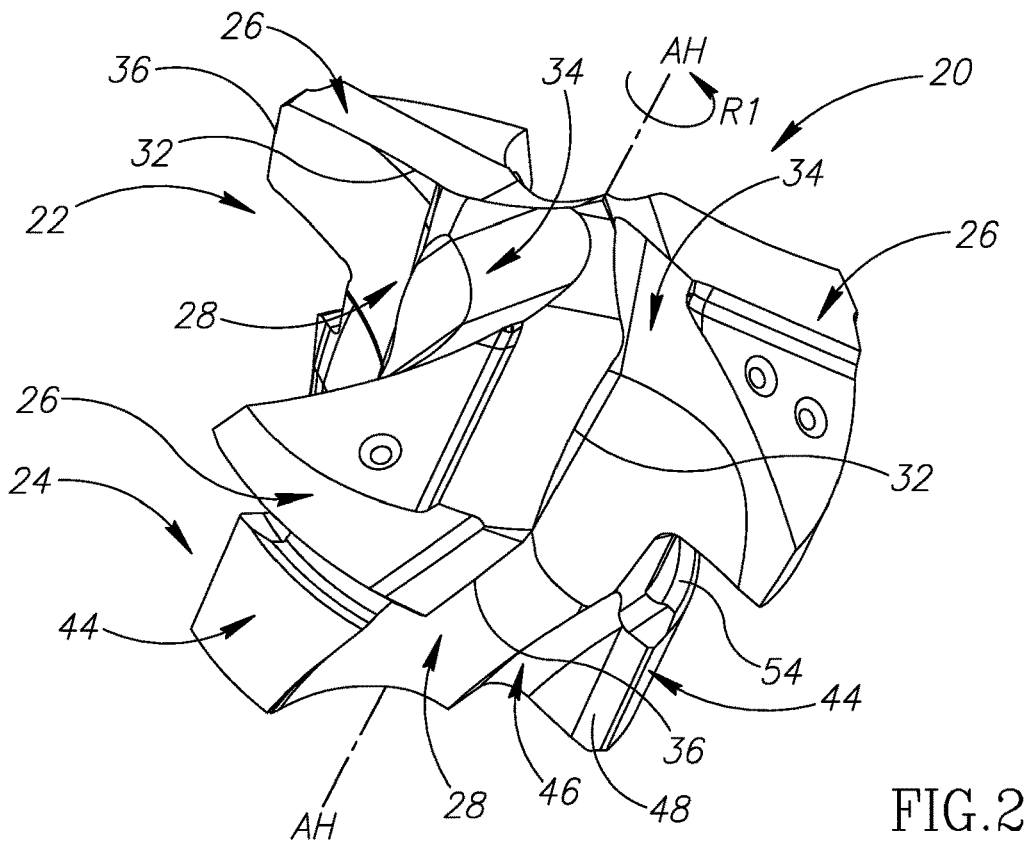
FIG. 2 is a second perspective view of the cutting head in accordance with some embodiments of the present invention.

As shown in FIGS. 2 and 5, each torque protrusion 44 has a torque transmission surface 48 facing opposite the direction of rotation R1.

In some embodiments of the present invention, each torque transmission surface 48 may be planar.

By configuring the plurality of torque transmission surfaces 48 to be disposed on the mounting protuberance 24, as opposed to the cap portion 22, advantageously allows the plurality of cutting portions 26 and web thinning regions 34 to be arranged in an optimized manner, for example, with respect to cutting chip development and cutting chip flow, without the requirement to provide additional space for torque transmission between a tool shank and the cutting head's cap portion 22.

It should be appreciated that the significance of arranging the plurality of cutting portions 26 and the plurality of head flutes 28 in an optimized manner is greater for cap portions 22 having smaller cutting diameters, and for cutting heads 20 having a value of N which is greater than two, i.e. N>2.

According to the present invention, as shown in FIG. 5, in a second cross-section taken in a second head plane PH2 parallel to the first head plane PH1 and intersecting the plurality of torque portions 38, each torque transmission surface 48 is at least partially located outside an imaginary clamping cylinder SC defined by the imaginary clamping circle CC, and each torque cut-out 46 has a recessed surface 50 located inside the imaginary clamping cylinder SC.

In some embodiments of the present invention, the imaginary clamping cylinder SC may have an imaginary peripheral surface IP extending parallel to the head axis AH, and each clamping surface 42 may be coincident with the imaginary peripheral surface IP.

Also, in some embodiments of the present invention, each torque transmission surface 48 may be entirely located outside the imaginary clamping cylinder SC.

Further, in some embodiments of the present invention, each recessed surface 50 may extend radially inwardly in the axial rearward direction DR.

Yet further, in some embodiments of the present invention, each recessed surface 50 may intersect a circumferentially adjacent and rotationally trailing head flute 28.

It should be appreciated that in some embodiments of the present invention, each recessed surface 50 may be circumferentially spaced apart from, and thus not intersect, a circumferentially adjacent and rotationally leading torque transmission surface 48.

Figure 6:
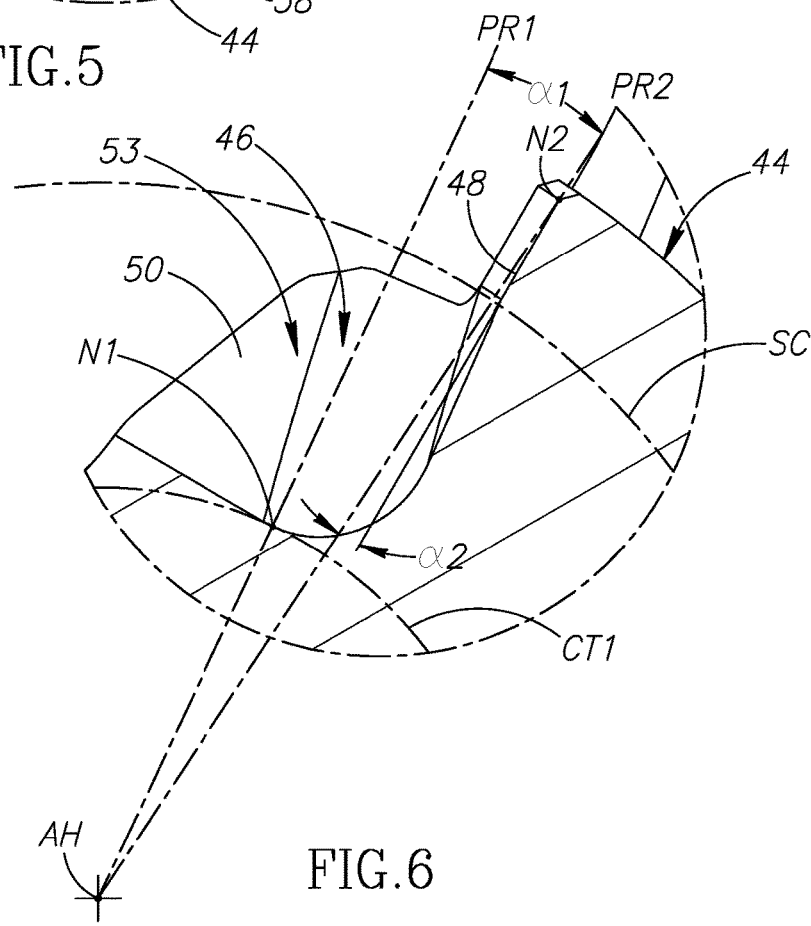
FIG. 6 is a detailed view of the cutting head shown in FIG. 5.

As shown in FIGS. 5 and 6, in the second cross-section taken in the second head plane PH2, each torque cut-out 46 has a radially innermost cut-out point N1 contained in a first radial plane PR1 containing the head axis AH, and each torque transmission surface 48 has a radially outermost transmission point N2 contained in a second radial plane PR2 containing the head axis AH.

In some embodiments of the present invention, the first and second radial planes PR1, PR2 associated with each torque portion 38 may form an acute first torque angle α1 of less than 45 degrees.

Also, in some embodiments of the present invention, as shown in FIGS. 5 and 6, in the second cross-section taken in the second head plane PH2, each torque transmission surface 48 may form a zero or acute second torque angle α2 of less than 30 degrees with the second radial plane PR2.

Further, in some embodiments of the present invention, as shown in FIGS. 5 and 6, in the second cross-section taken in the second head plane PH2, each torque transmission surface 48 may face its associated second radial plane PR2. In such embodiments, the entirety of each torque transmission surface 48 may be located rotationally forward of its associated second radial plane PR2, except at the radially outermost transmission point N2.

For embodiments of the present invention in which each torque transmission surface 48 forms a zero or acute second torque angle α2 of less than 30 degrees with the second radial plane PR2, efficient torque transmission is enabled between a tool shank and the cutting head 20.

It should be appreciated that the efficiency of torque transmission is improved for cutting heads 20 having a value of N which is greater than two, i.e. N>2.

As shown in FIG. 5, in the second cross-section taken in the second head plane PH2, the plurality of radially innermost cut-out points N1 define an imaginary first torque circle CT1 having a first torque diameter DT1.

In some embodiments of the present invention, the first torque diameter DT1 may be less than seventy percent of the clamping diameter DC, i.e. DT1<DC*0.70.

Also, as shown in FIG. 5, in the second cross-section taken in the second head plane PH2, the plurality of radially outermost transmission points N2 define an imaginary second torque circle CT2 having a second torque diameter DT2.

In some embodiments of the present invention, the second torque diameter DT2 may be greater than one hundred and ten percent of the clamping diameter DC, i.e. DT2>DC*1.10.

For embodiments of the present invention in which the second torque diameter DT2 is greater than one hundred and ten percent of the clamping diameter DC, stable torque transmission is enabled between a tool shank and the cutting head 20.

It should be appreciated that the stability of torque transmission is improved for cutting heads 20 having a value of N which is greater than two, i.e. N>2.

In some embodiments of the present invention, the second torque diameter DT2 may be greater than sixty percent of the cutting diameter DCU, i.e. DT2>DCU*0.60.

For embodiments of the present invention in which the second torque diameter DT2 is greater than sixty percent of the cutting diameter DCU, efficient torque transmission is enabled between a tool shank and the cutting head 20.

It should be appreciated that the efficiency of torque transmission is improved for cutting heads 20 having a value of N which is greater than two, i.e. N>2.

As shown in FIG. 5, in the second cross-section taken in the second head plane PH2, each torque cut-out 46 has a rotationally trailing-most cut-out point N3. As also seen in this figure, each rotationally trailing-most cut-out point N3 is outside the imaginary first torque circle CT1. Therefore, each rotationally trailing-most cut-out point N3 is located radially outward of its associated radially innermost cut-out point N1.

Also, as shown in FIG. 5, in the second cross-section taken in the second head plane PH2, each rotationally trailing-most cut-out point N3 is formed at the intersection of each torque cut-out 46 and its circumferentially adjacent and rotationally trailing head flute 28.

In some embodiments of the present invention, the radially innermost cut-out point N1 of each torque cut-out 46 may not be coincident with its associated rotationally trailing-most cut-out point N3.

As shown in FIGS. 1 and 3, the mounting protuberance 24 may have an end surface 52 distal from the cap portion 22 and facing in the axial rearward direction DR.

In some embodiments of the present invention, each end surface 52 may be perpendicular to the head axis AH.

Also, in some embodiments of the present invention, each recessed surface 50 may intersect the end surface 52.

As shown in FIGS. 1, 5 and 6, a plurality of N recesses 53 are formed in the mounting protuberance 24 inside the imaginary clamping cylinder SC, each recess 53 located between a circumferentially adjacent and rotationally leading torque protrusion 44 and a circumferentially adjacent and rotationally trailing head flute 28.

In some embodiments of the present invention, each recess 53 may open out to the end surface 52.

It should be appreciated that in some embodiments of the present invention, each recess 53 may correspond with one of the torque cut-outs 46.

As shown in FIGS. 2 and 3, each torque protrusion 44 may have an axial stopper surface 54 facing in an axial forward direction DF.

It should be appreciated that the axial forward direction DF is opposite the axial rearward direction DR.

In some embodiments of the present invention, each axial stopper surface 54 may be perpendicular to the head axis AH.

Also, in some embodiments of the present invention, each axial stopper surface 54 may be disposed rotationally ahead of its associated torque transmission surface 48.

As shown in FIG. 3, the end surface 52 may be located a first distance DS1 axially rearward of the cap base surface 30, and each axial stopper surface 54 may be located a second distance DS2 axially forward of the end surface 52.

In some embodiments of the present invention, the second distance DS2 may be greater than half of the axial distance DS1, i.e. DS2>DS1*0.50.

Also, in some embodiments of the present invention, each torque transmission surface 48 may have an axial extent EA of greater than eighty percent of the second distance DS2, i.e. EA>DS2*0.80.

For embodiments of the present invention in which the axial extent EA is greater than eighty percent of the second distance DS2, efficient torque transmission is enabled between a tool shank and the cutting head 20.

Figure 7:
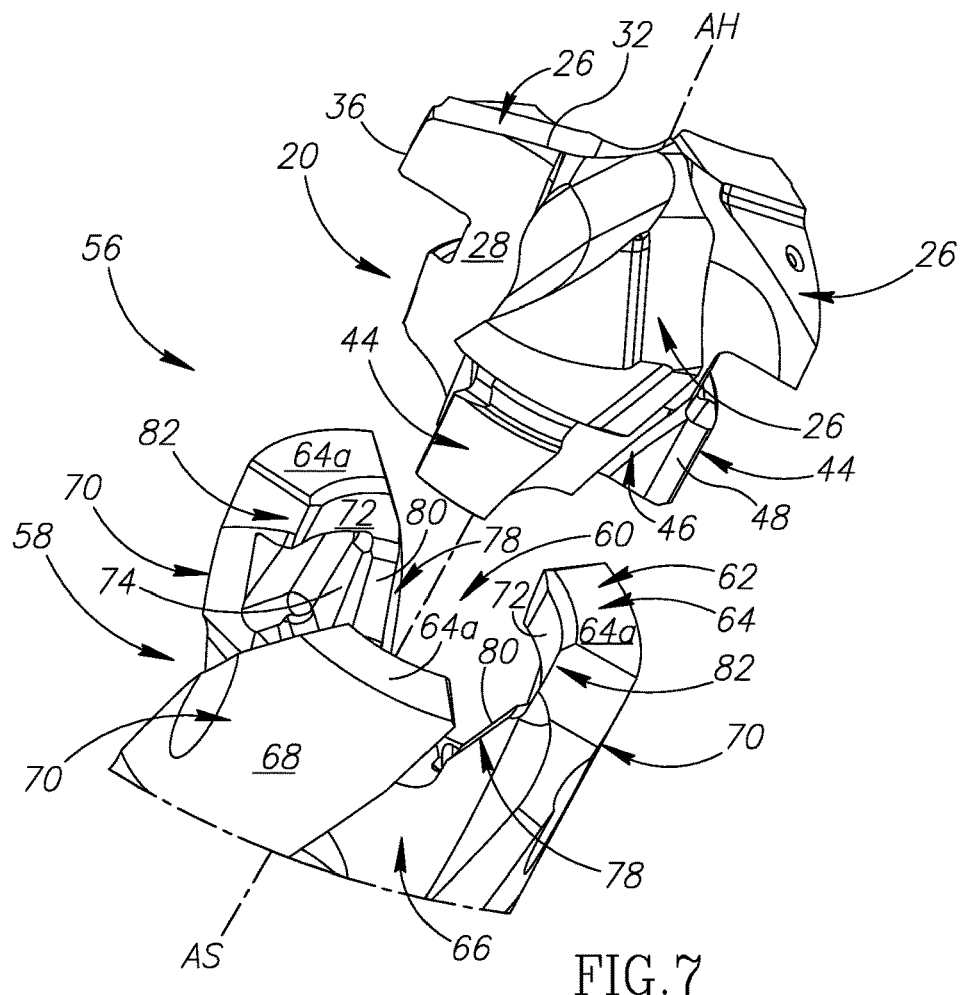
FIG. 7 is an exploded perspective view of a rotary cutting tool in accordance with some embodiments of the present invention.
Figure 8:
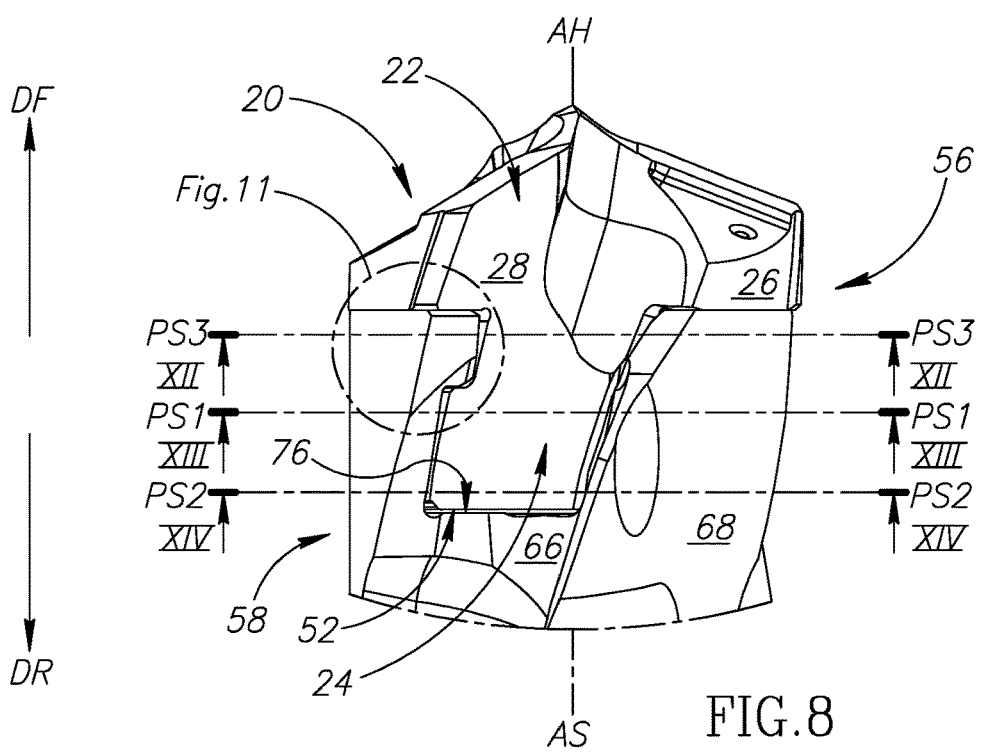
FIG. 8 is a side view of the rotary cutting tool shown in FIG. 7.

As shown in FIGS. 7 and 8, a second aspect of the present invention relates to a rotary cutting tool 56 having a tool shank 58 extending along a shank axis AS, and the cutting head 20 releasably secured to a head receiving pocket 60 of the tool shank 58 at forward end 62 thereof.

In some embodiments of the present invention, the tool shank 58 may preferably be manufactured from tool steel.

Also, in some embodiments the cutting head 20 may be releasably secured to the head receiving pocket 60 without the requirement of an additional fastening member, such as a clamping screw.

Figure 9:
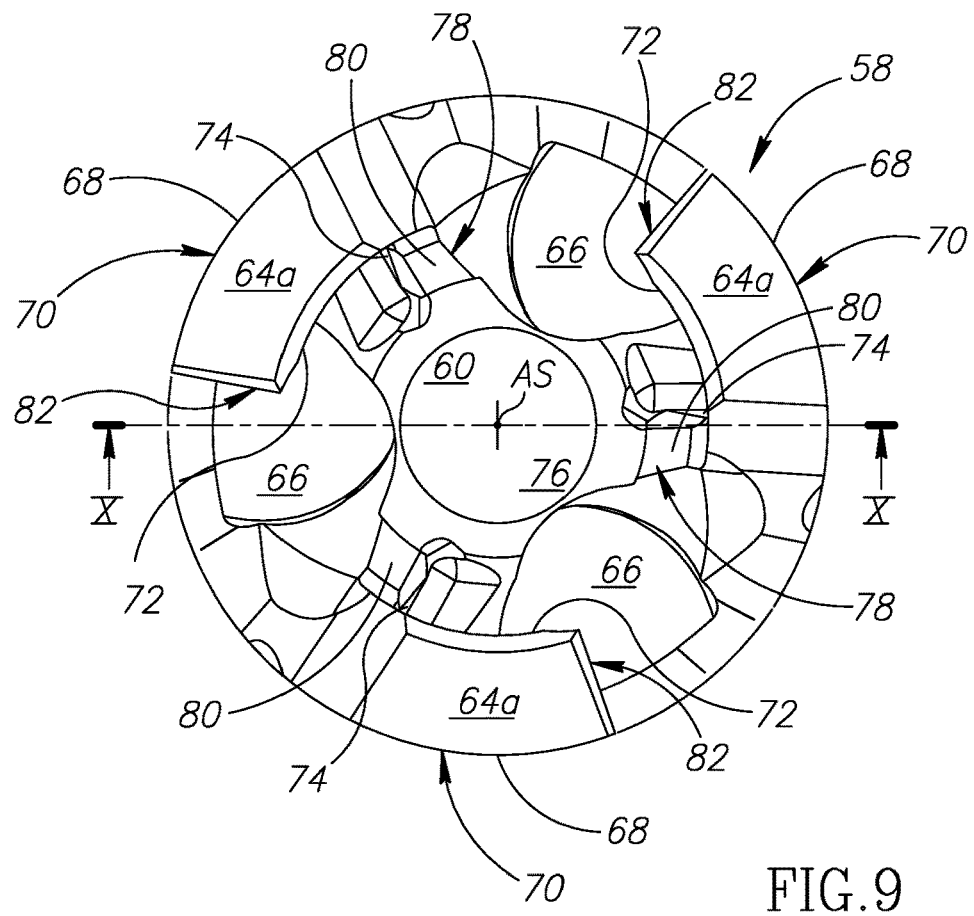
FIG. 9 is an end view of a tool shank in accordance with some embodiments of the present invention.
Figure 10:
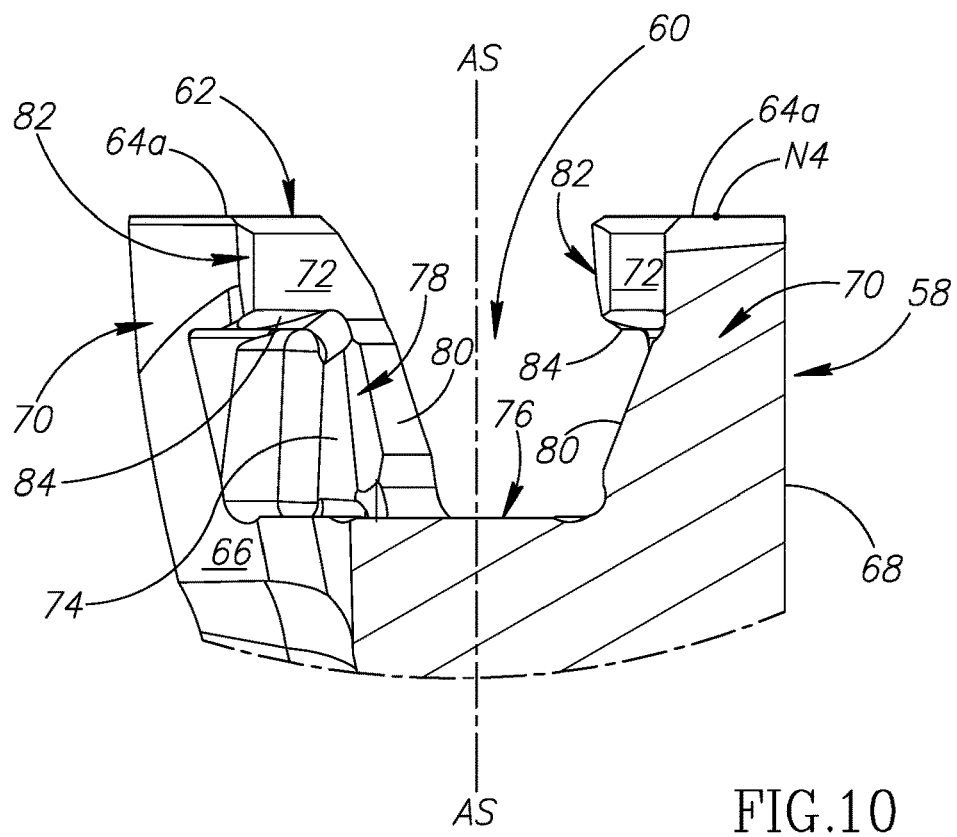
FIG. 10 is a cross-sectional view of the tool shank shown in FIG. 9, taken along the line X-X.

As shown in FIGS. 9 and 10, the forward end 62 has a shank support surface 64 transverse to the shank axis AS and the head receiving pocket 60 is formed in the shank support surface 64, In some embodiments of the present invention, the shank support surface 64 may be perpendicular to the shank axis AS.

Also, in some embodiments of the present invention, the shank support surface 64 may contain an axially forwardmost shank point N4 of the tool shank 58.

As shown in FIGS. 7 and 9, the tool shank 58 may have a plurality of N circumferentially spaced apart shank flutes 66 extending from the shank's forward end 62 along the shank axis AS.

In some embodiments of the present invention, the plurality of N shank flutes 66 may circumferentially alternate with a plurality of N shank lands 68, and each shank flute 66 may extend helically along the shank axis AS.

Also, in some embodiments of the present invention, the plurality of N shank flutes 66 may communicate with the head receiving pocket 60.

For embodiments of the present invention in which the plurality of N shank flutes 66 communicate with the head receiving pocket 60, a plurality of N circumferentially spaced apart shank projections 70 may be formed.

Also, for embodiments of the present invention in which the plurality of N shank flutes 66 communicate with the head receiving pocket 60, the shank support surface 64 may have a plurality of N circumferentially spaced apart shank support sub-surfaces 64*a*, each shank support sub-surface 64*a* being disposed on one of the shank projections 70.

As shown in FIGS. 8 and 11 to 14, in an assembled position of the rotary cutting tool 56:

the cap base surface 30 faces the shank support surface 64;

the head shank axis AH is coincident with the shank axis AS;

each clamping surface 42 is in contact with a corresponding radially inward facing abutment surface 72 of the head receiving pocket 60; and each torque transmission surface 48 is in contact with a corresponding drive surface 74 of the head receiving pocket 60, which faces in the direction of rotation R1.

It should be appreciated that the head receiving pocket 60 and the shank flutes 66 may be configured so that the plurality of shank projections 70 are resiliently displaceable, and so that the plurality of clamping surfaces 42 are resiliently retained against the plurality of abutment surfaces 72.

In some embodiments of the present invention, the cap base surface 30 may be in contact with the shank support surface 64.

For embodiments of the present invention in which the shank support surface 64 contains the axially forwardmost shank point N4 of the tool shank 58, no portion of the tool shank 58 extends axially forward of the cutting head's cap base surface 30.

By positioning the drive surfaces 74 axially rearward of the cutting head's cap portion 22 advantageously reduces the level of wear incurred by cutting chip flow on the shank projections 70, which may be manufactured from tool steel, having a hardness less than cemented carbide.

As shown in FIGS. 8 to 10, the head receiving pocket 60 may have a bottom surface 76 facing in the axial forward direction DF.

In some embodiments of the present invention, the bottom surface 76 may intersect the plurality of shank flutes 66.

Also, in some embodiments of the present invention, the mounting protuberance's end surface 52 may be spaced apart from the bottom surface 76.

As shown in FIGS. 9 and 10, each drive surface 74 may be disposed on a radial extending rib portion 78 of the head receiving pocket 60.

Figure 13:
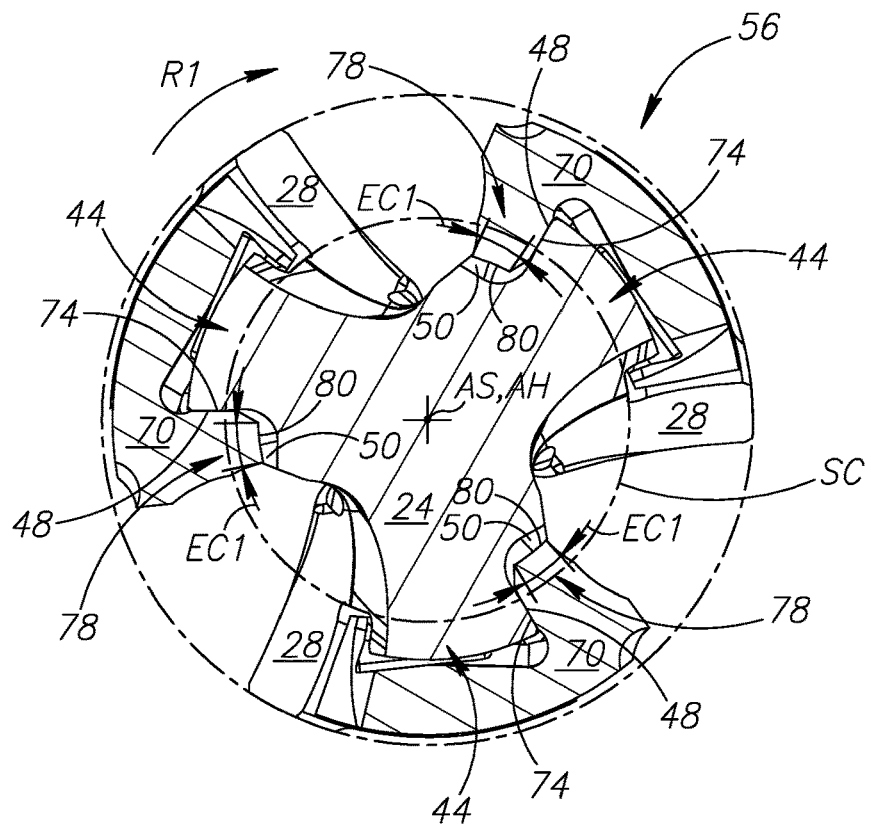
FIG. 13 is a cross-sectional view of the rotary cutting tool shown in FIG. 8, taken along the line XIII-XIII.
Figure 14:
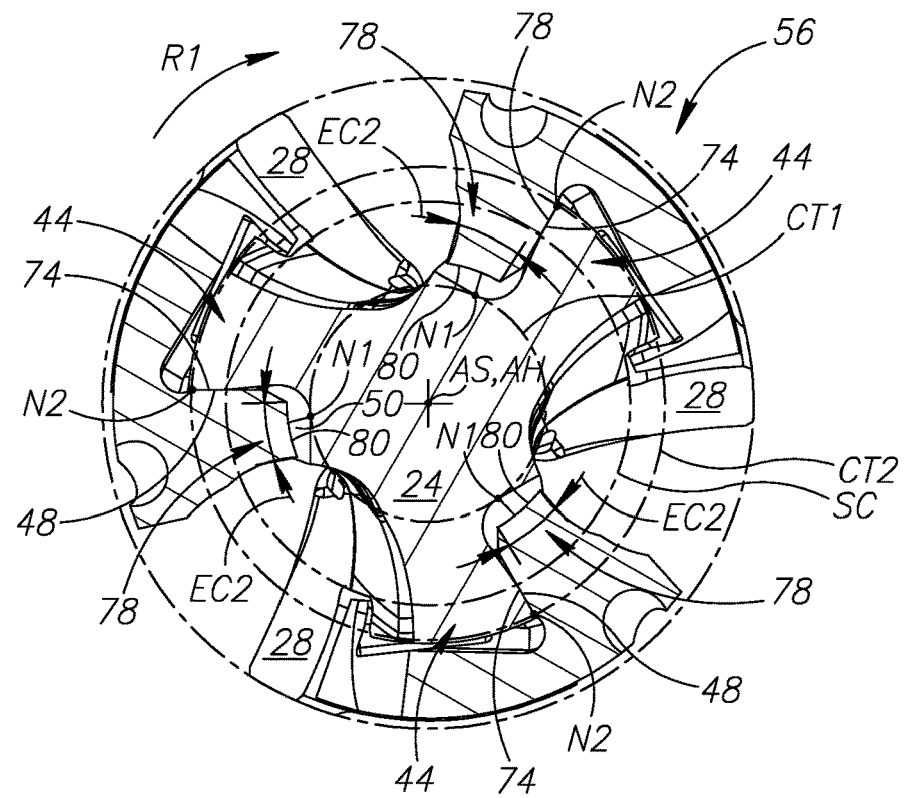
FIG. 14 is a cross-sectional view of the rotary cutting tool shown in FIG. 8, taken along the line XIV-XIV.

As shown in FIGS. 13 and 14, in cross-sections taken in first and second shank planes PS1, PS2 perpendicular to the shank axis AS and intersecting the plurality of rib portions 78, the plurality of torque transmission surfaces 48 are in contact with the plurality of drive surfaces 74.

In some embodiments of the present invention, the second shank plane PS2 may be coincident with the second head plane PH2.

As shown in FIGS. 13 and 14, each rib portion 78 may occupy one of the mounting protuberance's torque cut-outs 46.

It should be appreciated that the plurality of rib portions 78 provide the head receiving pocket 60 with its necessary rigidity and strength, and the plurality of torque cut-outs 46 provide the necessary space to accommodate the plurality of rib portions 78.

It should also be appreciated the use of the term "occupy" or "occupies" throughout the description and claims includes partial occupancy, for example, a configuration in which a part of each rib portion 78 occupies one of the mounting protuberance's torque cut-outs 46.

As shown in FIGS. 13 and 14, each rib portion 78 may have an elongated rib surface 80 located inside the imaginary clamping cylinder SC.

In some embodiments of the present invention, each elongated rib surface 80 may be spaced apart from the recessed surface 50 of its occupied torque cut-out 46.

For embodiments of the present invention in which the plurality of elongated rib surfaces 80 are spaced apart from the plurality of recessed surfaces 50, the plurality of elongated rib surfaces 80 do not make contact with the cutting head's mounting protuberance 24, and the plurality of recessed surfaces 50 do not make contact with the tool shank's head receiving pocket 60.

As shown in FIGS. 9 and 10, each elongated rib surface 80 may extend radially inwardly in the axial rearward direction DR.

In some embodiments of the present invention, each elongated rib surface 80 may intersect one of the shank flutes 66.

As shown in FIGS. 13 and 14, in the cross-section taken in the first shank plane PS1, each rib surface 80 has a first circumferential extent EC1, and in the cross-section taken in the second shank plane PS2, each rib surface 80 has a second circumferential extent EC2.

In some embodiments of the present invention, the second shank plane PS2 may be located axially rearward of the first shank plane PS1, and the second circumferential extent EC2 may be greater than the first circumferential extent EC1.

For embodiments of the present invention in which the second circumferential extent EC2 is greater than the first circumferential extent EC1, the plurality of rib portions 78 are advantageously robust.

As shown in FIGS. 9 and 10, each abutment surface 72 may be disposed on a circumferentially extending ledge portion 82 of the head receiving pocket 60, and the plurality of ledge portions 82 may be located axially forward of the plurality of rib portions 78.

In some embodiments of the present invention, each shank support sub-surface 64a may be disposed on one of the ledge portions 82 adjacent to one of the abutment surfaces 72.

Figure 12:
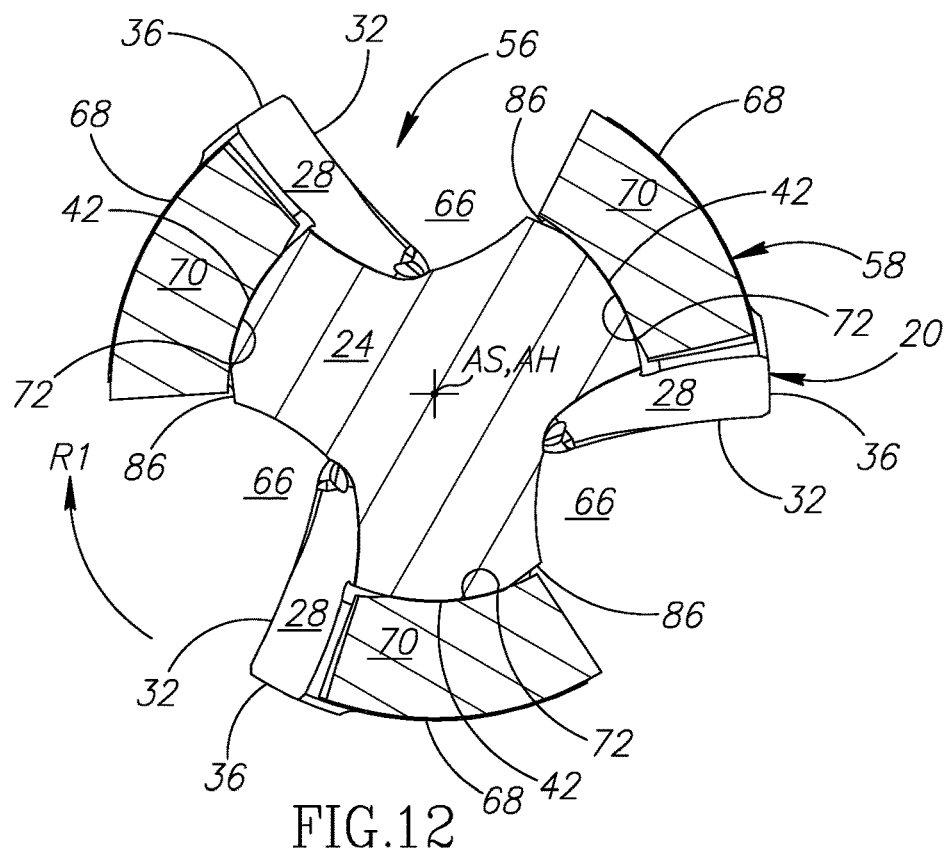
FIG. 12 is a cross-sectional view of the rotary cutting tool shown in FIG. 8, taken along the line XII-XII.

As shown in FIG. 12, in a cross-section taken in a third shank plane PS3 perpendicular to the shank axis AS and intersecting the plurality of ledge portions 82, the plurality of clamping surfaces 42 are in contact with the plurality of abutment surfaces 72.

In some embodiments of the present invention, the third shank plane PS3 may be coincident with the first head plane PH1.

Figure 11:
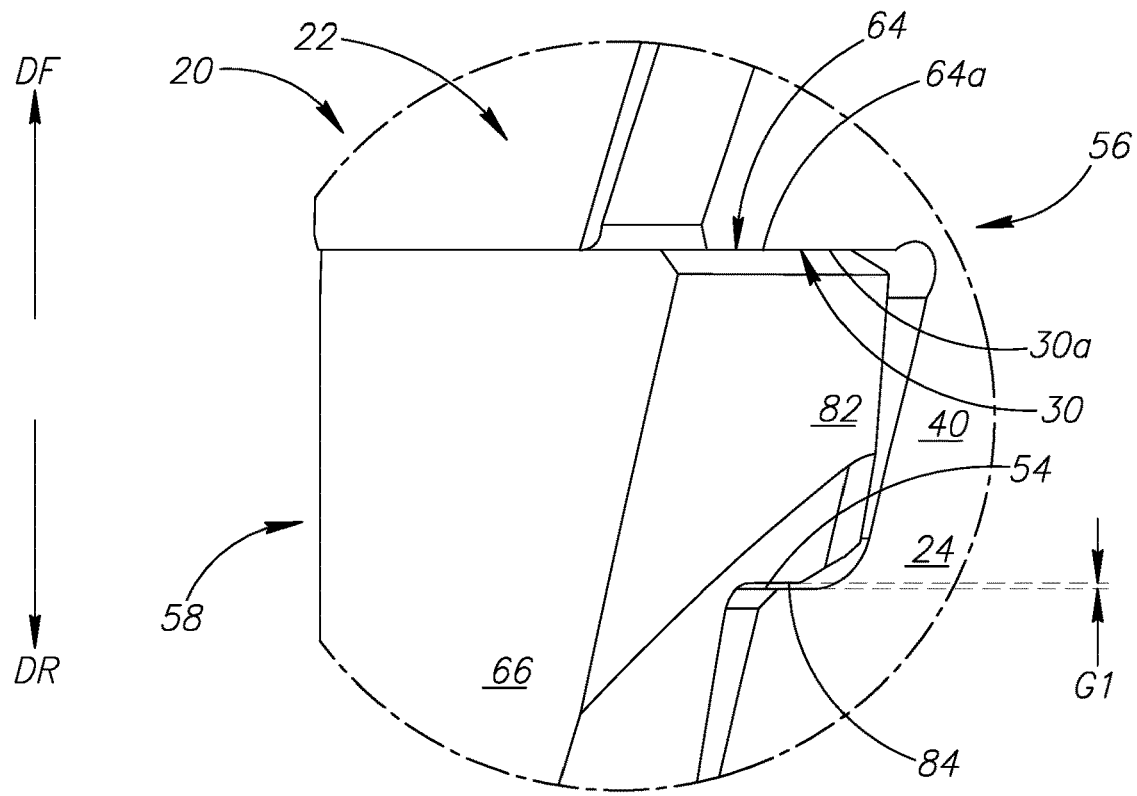
FIG. 11 is a detailed view of the rotary cutting tool shown in FIG. 8.

As shown in FIGS. 10 and 11, each ledge portion 82 may have an axial stopping surface 84 facing in the axial rearward direction DR.

In some embodiments of the present invention, each axial stopping surface 84 may be disposed adjacent to one of the abutment surfaces 72.

Also, in some embodiments of the present invention, each axial stopping surface 84 may face one of the cutting head's axial stopper surfaces 54.

As shown in FIG. 11, each axial stopper surface 54 may be spaced apart from its associated axial stopping surface 84 by an axial gap G1.

In some embodiments of the present invention, the axial gap G1 may be less than 0.3 mm, i.e. G1<0.3 mm.

It should be appreciated that for instances of excessive axial 'pulling' forces acting on the cutting head 20, the cap base surface 30 may not remain in contact with the shank support surface 64 and the plurality of axial stopper surfaces 54 may make contact with the plurality of axial stopping surfaces 84, thus preventing the cutting head 20 from becoming detached from the tool shank 58. Therefore, the axial stopping surfaces 84 collectively serve as a pullout preventer configured to prevent the cutting head 20 from becoming detached from the tool shank 58.

In some embodiments of the present invention, it should also be appreciated that apart from the plurality of clamping surfaces 42 contacting the plurality of abutment surfaces 72, the plurality of torque transmission surfaces 48 contacting the plurality of drive surfaces 74, and the cap base surface 30 contacting the shank support surface 64 or the plurality of axial stopper surfaces 54 contacting the plurality of axial stopping surfaces 84, there may be no contact between the cutting head 20 and the tool shank 58.

The present invention further relates to a method of assembling the rotary cutting tool 56, comprising the steps of:
a) orienting the cap base surface 30 to face the shank support surface 64;
b) aligning the head axis AH with the shanks axis AS;
c) rotationally aligning the plurality of torque protrusions 44 with the plurality of shank flutes 66;
d) inserting the mounting protuberance 24 into the head receiving pocket 60; and
e) rotating the cutting head 20 about its head axis AH opposite the direction of rotation R1, until the plurality of clamping surfaces 42 are retained against the plurality of abutment surfaces 72, and the plurality of torque transmission surfaces 48 are in contact with the plurality of drive surfaces 74.

In some embodiments of the present invention, in step d) of the tool assembly, the mounting protuberance 24 may be inserted into the head receiving pocket 60 until the cap base surface 30 makes contact with the shank support surface 64.

As shown in FIGS. 1, 3 and 4, each clamping portion 40 may have a clamping guide surface 86 circumferentially adjacent and rotationally trailing its associated clamping surface 42.

In some embodiments of the present invention, each clamping guide surface 86 may taper radially inwardly in a direction opposite the direction of rotation R1.

Also, in some embodiments of the present invention, each clamping guide surface 86 may intersect its circumferentially adjacent and rotationally trailing head flute 28.

It should be appreciated that the provision of a clamping guide surface 86 on each clamping portion 42 facilitates step e) of the tool assembly and prevents inadvertent snagging between the plurality of clamping portions 40 and the plurality of ledge portions 82.

Although the present invention has been described to a certain degree of particularity, it should be understood that various alterations and modifications could be made without departing from the spirit or scope of the invention as hereinafter claimed.

What is claimed is:

1. A cutting head (20) having a head axis (AH) establishing an axial forward direction (DF) and an axial rearward direction (DR), the cutting head (20) rotatable about the head axis (AH) in a direction of rotation (R1), and comprising:
   a cap portion (22) having a plurality of N cutting portions (26) circumferentially alternating with a plurality of N head flutes (28), and a cap base surface (30) facing in the axial rearward direction (DR); and
   a mounting protuberance (24) joined to the cap portion (22), extending axially rearwardly from the cap base surface (30), and comprising:
      a mounting protuberance end surface (52) distal from the cap portion (22) and facing in the axial rearward direction (DR),
      a plurality of N circumferentially spaced apart torque portions (38), and
      a plurality of N circumferentially spaced apart clamping portions (40),
         each torque portion (38) being axially offset from a corresponding clamping portion (40), along the head axis (AH),
         each clamping portion (40) having a radially outward facing clamping surface (42),
         each torque portion (38) having a radially outward extending torque protrusion (44) and a torque cut-out (46), the torque cut-out being circumferentially adjacent to and rotationally trailing the torque protrusion (44), and
         each torque protrusion (44) having a torque transmission surface (48) facing opposite the direction of rotation (R1),
   wherein in a first cross-section taken in a first head plane (PH1) perpendicular to the head axis (AH) and intersecting the plurality of clamping portions (40):
      an imaginary clamping circle (CC) having a clamping diameter (DC) circumscribes the plurality of clamping surfaces (42), and
   wherein in a second cross-section taken in a second head plane (PH2) parallel to the first head plane (PH1) and intersecting the plurality of torque portions (38):

each torque transmission surface (48) is at least partially located outside an imaginary clamping cylinder (SC) defined by the imaginary clamping circle (CC), and each torque cut-out (46) has a recessed surface (50) located inside the imaginary clamping cylinder (SC), a radially innermost cut-out point (N1), and a rotationally trailing-most cut-out point (N3), the radially innermost cut-out point (N1) being non-coincident with the rotationally trailing-most cut-out point (N3).

2. The cutting head (20) according to claim 1, wherein each recessed surface (50) extends radially inwardly in the axial rearward direction (DR).

3. The cutting head (20) according to claim 1, wherein:
each torque cut-out (46) comprises a recess (53) formed in the mounting protuberance (24), inside the imaginary clamping cylinder (SC);
each recess (53) is located between a circumferentially adjacent and rotationally leading torque protrusion (44) and a circumferentially adjacent and rotationally trailing head flute (28); and
each recess (53) intersects the end surface (52).

4. The cutting head (20) according to claim 1, wherein the plurality of torque portions (38) are located axially rearward of the plurality of clamping portions (40).

5. The cutting head (20) according to claim 1, wherein:
the plurality of torque portions (38) are circumferentially spaced apart by the plurality head flutes (28), and
the plurality of clamping portions (40) are circumferentially spaced apart by the plurality head flutes (28).

6. The cutting head (20) according to claim 5, wherein each recessed surface (50) intersects a circumferentially adjacent and rotationally trailing head flute (28).

7. The cutting head (20) according to claim 5, wherein each clamping surface (42) intersects a circumferentially adjacent and rotationally leading head flute (28).

8. The cutting head (20) according to claim 5, wherein in the second cross-section taken in the second head plane (PH2):
each rotationally trailing-most cut-out point (N3) is formed at the intersection of each torque cut-out (46) and its circumferentially adjacent and rotationally trailing head flute (28), and
each rotationally trailing-most cut-out point (N3) is located radially outward of its associated radially innermost cut-out point (N1).

9. The cutting head (20) according to claim 1, wherein in the first cross-section taken in the first head plane (PH1), each clamping surface (42) is coincident with the imaginary clamping circle (CC).

10. The cutting head (20) according to claim 1, wherein in the second cross-section taken in the second head plane (PH2):
each radially innermost cut-out point (N1) is contained in a first radial plane (PR1) containing the head axis (AH),
each torque transmission surface (48) has a radially outermost transmission point (N2) contained in a second radial plane (PR2) containing the head axis (AH), and
the first and second radial planes (PR1, PR2) associated with each torque portion (38) form an acute first torque angle (a1) of less than 45 degrees.

11. The cutting head (20) according to claim 10, wherein in the second cross-section taken in the second head plane (PH2):

the plurality of radially outermost transmission points (N2) define an imaginary second torque circle (CT2) having a second torque diameter (DT2), and
the second torque diameter (DT2) is greater than one hundred and ten percent of the clamping diameter (DC).

12. The cutting head (20) according to claim 10, wherein in the second cross-section taken in the second head plane (PH2):
the plurality of radially innermost cut-out points (N1) define an imaginary first torque circle (CT1) having a first torque diameter (DT1), and
the first torque diameter (DT1) is less than seventy percent of the clamping diameter (DC).

13. The cutting head (20) according to claim 1, wherein:
each torque protrusion (44) has an axial stopper surface (54) facing in the axial forward direction (DF) opposite the axial rearward direction (DR).

14. The cutting head (20) according to claim 1, wherein N equals 3.

15. A rotary cutting tool (56) comprising, in combination:
a cutting head (20) having a head axis (AH) establishing an axial forward direction (DF) and an axial rearward direction (DR), the cutting head (20) rotatable about the head axis (AH) in a direction of rotation (R1), and comprising:
a cap portion (22) having a plurality of N cutting portions (26) circumferentially alternating with a plurality of N head flutes (28), and a cap base surface (30) facing in the axial rearward direction (DR); and
a mounting protuberance (24) joined to the cap portion (22), extending axially rearwardly from the cap base surface (30), and comprising:
a mounting protuberance end surface (52) distal from the cap portion (22) and facing in the axial rearward direction (DR),
a plurality of N circumferentially spaced apart torque portions (38), and
a plurality of N circumferentially spaced apart clamping portions (40),
each torque portion (38) being axially offset from a corresponding clamping portion (40), along the head axis (AH),
each clamping portion (40) having a radially outward facing clamping surface (42),
each torque portion (38) having a radially outward extending torque protrusion (44) and a torque cut-out (46), the torque cut-out being circumferentially adjacent to and rotationally trailing the torque protrusion (44), and
each torque protrusion (44) having a torque transmission surface (48) facing opposite the direction of rotation (R1),
wherein in a first cross-section taken in a first head plane (PH1) perpendicular to the head axis (AH) and intersecting the plurality of clamping portions (40):
an imaginary clamping circle (CC) having a clamping diameter (DC) circumscribes the plurality of clamping surfaces (42), and
wherein in a second cross-section taken in a second head plane (PH2) parallel to the first head plane (PH1) and intersecting the plurality of torque portions (38):
each torque transmission surface (48) is at least partially located outside an imaginary clamping cylinder (SC) defined by the imaginary clamping circle (CC), and each torque cut-out (46) has a recessed surface (50) located inside the imaginary clamping cylinder (SC); and a tool shank (58) extending along a shank axis (AS) and having a head receiving pocket (60) at forward end (62) thereof, the tool shank's forward end (60) having a shank support surface (64) transverse to the shank axis (A2) and the head receiving pocket (60) being formed in the shank support surface (64), wherein in an assembled position of the tool:

the cutting head (20) is releasably secured to the head receiving pocket (60);

the cap base surface (30) faces the shank support surface (64);

the head axis (AH) is coincident with the shank axis (AS);

each clamping surface (42) is in contact with a corresponding radially inward facing abutment surface (72) of the head receiving pocket (60); and each torque transmission surface (48) is in contact with a corresponding drive surface (74) of the head receiving pocket (60), which faces in the direction of rotation (R1).

16. The rotary cutting tool (56) according to claim 15, wherein:

each drive surface (74) is disposed on a radially extending rib portion (78) of the head receiving pocket (60), and each rib portion (78) occupies one of the torque cut-outs (46).

17. The rotary cutting tool (56) according to claim 16, wherein:

each rib portion (78) has an elongated rib surface (80) located inside the imaginary clamping cylinder (SC) of the cutting head (20).

18. The rotary cutting tool (56) according to claim 17, wherein:

each elongated rib surface (80) is spaced apart from the recessed surface (50) of its occupied torque cut-out (46).

19. The rotary cutting tool (56) according to claim 17, wherein:

each elongated rib surface (80) extends radially inwardly in the axial rearward direction (DR).

20. The rotary cutting tool (56) according to claim 17, wherein:

the tool shank (58) has a plurality of N shank flutes (66) helically extending along the shank axis (AS) and intersecting the shank support surface (64), and each elongated rib surface (80) intersects one of the shank flutes (66).

21. The rotary cutting tool (56) according to claim 16, wherein:

each abutment surface (72) is disposed on a circumferentially extending ledge portion (82) of the head receiving pocket (60), and the plurality of ledge portions (82) are located axially forward of the plurality of rib portions (78).

22. The rotary cutting tool (56) according to claim 21, wherein:

each ledge portion (82) has an axial stopping surface (84) facing in the axial rearward direction (DR).

23. The rotary cutting tool (56) according to claim 22, wherein:

each torque protrusion (44) has an axial stopper surface (54), and each axial stopping surface (84) faces one of the axial stopper surfaces (54).

24. A cutting head (20) having a head axis (AH) establishing an axial forward direction (DF) and an axial rearward direction (DR), the cutting head (20) rotatable about the head axis (AH) in a direction of rotation (R1), and comprising:

a cap portion (22) having a plurality of N cutting portions (26) circumferentially alternating with a plurality of N head flutes (28), and a cap base surface (30) facing in the axial rearward direction (DR); and a mounting protuberance (24) joined to the cap portion (22), extending axially rearwardly from the cap base surface (30), and comprising:

a mounting protuberance end surface (52) distal from the cap portion (22) and facing in the axial rearward direction (DR);

a plurality of N circumferentially spaced apart clamping portions (40) each having a radially outward facing clamping surface (42), wherein in a first cross-section taken in a first head plane (PH1) perpendicular to the head axis (AH) and intersecting the plurality of clamping portions (40), an imaginary clamping circle (CC) having a clamping diameter (DC) circumscribes the plurality of clamping surfaces (42);

a plurality of N circumferentially spaced apart torque portions (38), each torque portion (38) being axially offset from a corresponding clamping portion (40) and having a radially outward extending torque protrusion (44), each torque protrusion comprising a torque transmission surface (48) facing opposite the direction of rotation (R1), wherein in a second cross-section taken in a second head plane (PH2) parallel to the first head plane (PH1) and intersecting the plurality of torque portions (38), each torque transmission surface (48) is at least partially located outside an imaginary clamping cylinder (SC) defined by the imaginary clamping circle (CC); and a plurality of N recesses (53) formed inside the imaginary clamping cylinder (SC) and opening out to the end surface (52), each recess (53) located between a circumferentially adjacent and rotationally leading torque protrusion (44) and a circumferentially adjacent and rotationally trailing head flute (28);

wherein:

the torque portions (38) are located closer to the end surface (52) than the clamping portions (40); and the mounting protuberance (24) exhibits N-fold rotational symmetry about the head axis (AH).

25. The cutting head (20) according to claim 24, wherein N equals 3.

* * * * *